UNITED STATES PATENT OFFICE 2,526,477

5-HYDROXY-1,3,4-TRIAZAINDOLIZINES AND PROCESS OF PREPARING THE SAME

Newton Heimbach, Palisades Park, N. J., assignor to General Aniline & Film Corporation, New York, N. Y., a corporation of Delaware No Drawing. Application October 21, 1949, Serial No. 122,840

8 Claims. (Cl. 260—256.4)

This invention relates to 5-hydroxy-1,3,4-triazaindolizines, and to a method of preparing the same.

It is known in the art that light-sensitive emulsions, such as gelatin silver halide emulsions, have a decided tendency to fog. The fog may be of two types, namely, yellow fog and chemical (gray) fog. The yellow fog, sometimes referred to as color fog or dichroic fog, is essentially a colloidal deposit of silver, the color intensity and general appearance of which are determined by the minute particle size and degree of subdivision. The fog is chiefly yellow in color and is most apparent in the lighter portions of a negative. The color may vary, however, and the colloidal silver particles may, for example, appear green by reflected light, and yellow or red by transmitted light. The so-called chemical fog, or gray fog, on the other hand, is the more common and is formed in a number of ways. It may be caused by premature exposure, by excessive ripening of the emulsions, or by the storage of the film, particularly at high temperatures or for unusually long periods of time.

It is an object of the present invention to provide 5-hydroxy-1,3,4-triazaindolizines useful as stabilizers for silver halide emulsions.

Another object of this invention is to provide a process of preparing such 5-hydroxy-1,3,4-triazaindolizines.

A further object is to provide 5-hydroxy-1,3,4-triazaindolizines as stabilizers or fog inhibiting agents which tend to prevent the formation of chemical fog in light-sensitive silver halide emulsions.

A still further object is to provide stabilizers or anti-fogging agents for light-sensitive silver halide emulsions, which increase their stability without lowering their sensitivity.

Still further objects and advantages will appear from the following specification.

I have found that the above objects are accomplished by condensing an alkoxymethylene malonic acid ester with a 3-amino-1,2,4-triazole. The resulting condensation product is characterized by a structure corresponding to the following general formula:

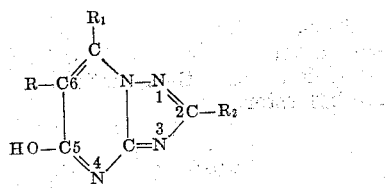

wherein R is hydrogen or a carbalkoxy group of not more than 4 carbon atoms, e. g., carbomethoxy, carbethoxy, carbopropoxy, and carboisopropoxy, $R_1$ is either hydrogen, methyl or a phenyl group, and $R_2$ is hydrogen, an alkyl group of not more than 4 carbon atoms, e. g., methyl, ethyl, propyl, isopropyl, butyl, or isobutyl, or an aryl group of the benzene series, e. g., phenyl o-, m-, and p-tolyl, etc., carboxy, or carbalkoxy group of the same value as R, $R_2$ being carbalkoxy only when R is carbalkoxy, and carboxy only when R is hydrogen.

The method for the preparation of 5-hydroxy-1,3,4-triazaindolizines consists of condensing 1 mol of an alkoxymethylene malonic acid ester of the following general formula:

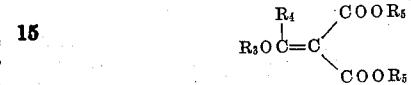

wherein $R_3$ and $R_5$ are alkyl groups as referred to above in the definitions of $R_2$, $R_4$ is either hydrogen, methyl, or a phenyl group, with 1 mol of 3-amino-1,2,4-triazole of the following general formula:

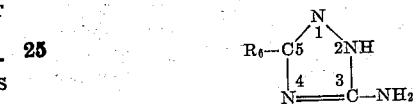

wherein $R_6$ is of the same value as $R_2$.

The reaction takes place as follows:

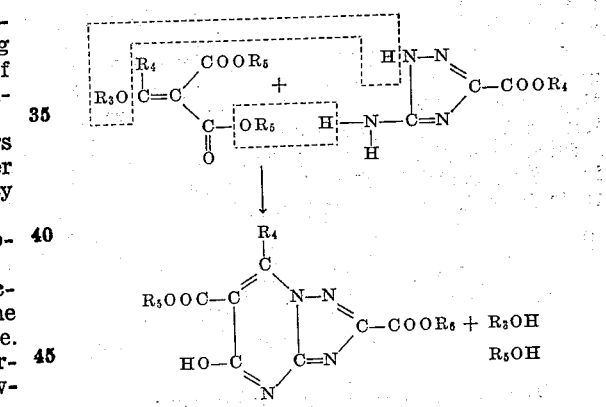

Suitable alkoxymethylene malonic esters are, for example, methoxymethylene malonic acid dimethyl ester, methoxymethylene malonic acid diethyl ester, ethoxymethylene malonic acid dimethyl ester, ethoxymethylene malonic acid diethyl ester, ethoxyphenylmethylene malonic acid diethyl ester, ethoxymethylene malonic acid dipropyl ester, methoxymethylmethylene malonic acid dimethyl ester and the like.

As suitable 3-amino-1,2,4-triazoles may be mentioned, 3-amino-1,2,4-triazole, 3-amino-5- methyl-1,2,4-triazole, 3-amino-5-ethyl-1,2,4-triazole, 3-amino-5-propyl-1,2,4-triazole, 3-amino-5-butyl-1,2,4-triazole, 3-amino-5-phenyl-1,2,4-triazole, 3-amino-5-carbomethoxy-1,2,4-triazole, 3-amino-5-carbethoxy-1,2,4-triazole, and the like.

The condensation between the alkoxymethylene malonic acid ester and the 3-amino-1,2,4-triazole is carried out by heating the reaction components at a temperature ranging from 100–120° C., preferably at reflux temperature, in the presence of an inert, water-binding, solvent-diluent, such as glacial acetic acid, and the like for a period of 1 to 3 hours. During this treatment 2 molecules of alcohol are formed as the condensation or ring closure between the reactants proceeds. The final product either precipitates or is removed by diluting the solvent-diluent with water, ethyl ether, acetone, or the like, and is recrystallized from alcohol, e. g., methanol, ethanol, etc., or an alcohol-water mixture.

The carbalkoxy group in the 6-position ($R$ group) of the 5-hydroxy-1,3,4-triazaindolizines may be replaced by hydrogen by saponification and decarboxylation of said carbalkoxy radicals. The saponification and decarboxylation are accomplished by heating the compound, containing the carbalkoxy radical, at a temperature ranging from 90–110° C., or at reflux temperature, in the presence of a 5% aqueous solution of a water soluble alkali, such as sodium carbonate, sodium or potassium hydroxide, and the like, for a period of ½ to 1 hour. The reaction mixture is cooled, diluted with water and filtered. There is then added thereto an excess of 5 N $H_2SO_4$. The mixture is next boiled for ½ hour and cooled. A few cc. of 5 N NaOH are added to neutralize the excess $H_2SO_4$ and the solution allowed to stand in an ice bath for about 1 hour; during which time the decarboxylated compound precipitates. The final product is recrystallized from boiling water.

Any carbalkoxy group in the 2-position ($R_2$ group) is saponified by the above treatment with aqueous alkali, but the resulting carboxy group is not effected by following the decarboxylation step while heating in dilute sulfuric acid.

The 3-amino-1,2,4-triazoles and the alkoxymethylene malonic acid esters are well known to the art and the methods for their preparation need not be described herein.

Specific compounds which have been prepared in accordance with the above procedures, with their formulae are as follows:

(1)

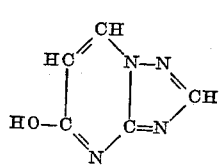

5-hydroxy-6-carbethoxy-1,3,4-triazaindolizine

Prepared by the condensation of 1 molar equivalent of 3-amino-1,2,4-triazole with 1 molar equivalent of ethoxymethylene malonic acid ethyl ester.

(2)

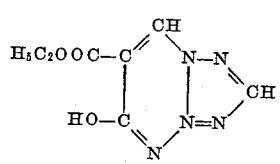

5-hydroxy-1,3,4-triazaindolizine

Prepared by the condensation of 1 molar equivalent of 3-amino-1,2,4-triazole with 1 molar equivalent of ethoxymethylene malonic acid ethyl ester, followed by saponification and decarboxylation by the consecutive action of sodium hydroxide and sulfuric acid in aqueous solution.

(3)

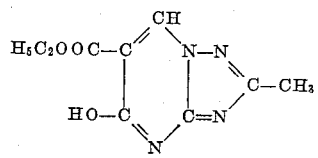

5-hydroxy-6-carbethoxy-2-methyl-1,3,4-triazaindolizine

Prepared by the condensation of 1 molar equivalent of 3-amino-1-methyl-1,2,4-triazole with 1 molar equivalent of ethoxymethylene malonic acid ethyl ester.

(4)

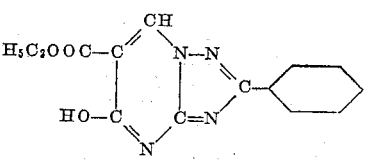

5-hydroxy-6-carbethoxy-2-phenyl-1,3,4-triazaindolizine

Prepared by the condensation of 1 molar equivalent of 3-amino-1-phenyl-1,2,4-triazole with 1 molar equivalent of ethoxymethylene malonic acid ethyl ester.

(5)

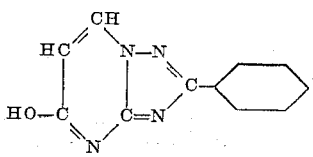

5-hydroxy-2-phenyl-1,3,4-triazaindolizine

Prepared by saponification and decarboxylation of Compound 4 by the consecutive action of sodium hydroxide and sulfuric acid in aqueous solution.

(6)

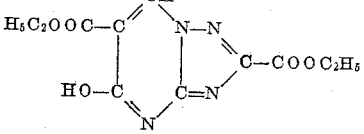

5-hydroxy-2,6-dicarbethoxy-1,3,4-triazaindolizine

Prepared by the condensation of 1 molar equivalent of 3-amino-1-carbethoxy-1,2,4-triazole with 1 molar equivalent of ethoxymethylene malonic acid ethyl ester.

(7)

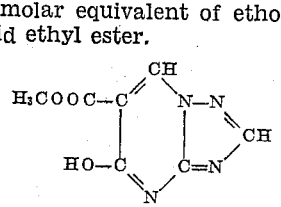

5-hydroxy-6-carbomethoxy-1,3,4-triazaindolizine

Prepared by the condensation of 1 molar equivalent of 3-amino-1,2,4-triazole with 1 molar equivalent of ethoxymethylene malonic acid methyl ester.

(8)

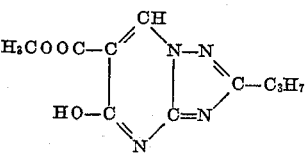

5-hydroxy-6-carbomethoxy-2-propyl-1,3,4-triazaindolizine

Prepared by the condensation of 1 molar equivalent of 3-amino-1-propyl-1,2,4-triazole with 1 molar equivalent of ethoxymethylene malonic acid methyl ester.

(9)
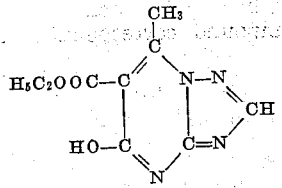

5-hydroxy-6-carbethoxy-7-methyl-1,3,4-triazaindolizine

Prepared by the condensation of 1 molar equivalent of 3-amino-1,2,4-triazole with 1 molar equivalent of methylethoxymethylene malonic acid ethyl ester.

(10)
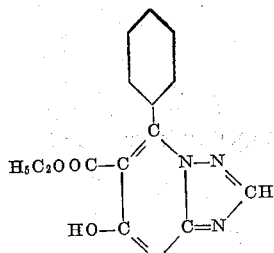

5-hydroxy-6-carbethoxy-7-phenyl-1,3,4-triazaindolizine

Prepared by the condensation of 1 molar equivalent of 3-amino-1,2,4-triazole with 1 molar equivalent of phenylethoxymethylene malonic acid ethyl ester.

All of the foregoing compounds are white crystalline solids.

The following examples are intended to illustrate the preparation of the compounds disclosed above. It will be appreciated that the conditions of the reaction, e. g., time of reaction and temperature, may be varied and that supplementary processes of purification may be resorted to wherever found desirable. These and other variations and modifications will be evident to those skilled in the art in the light of the principles disclosed herein.

*Example I*

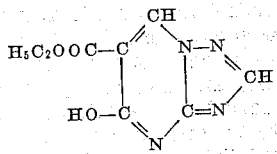

5-hydroxy-6-carbethoxy-1,3,4-triazaindolizine

A solution of 0.25 mol (54 grams) of ethyl ethoxymethylene malonate and 0.25 mol (21 grams) of 3-amino-1,2,4-triazole in 40 cc. of glacial acetic acid was refluxed for 2 to 3 hours. Upon cooling, a white product precipitated. After filtering and washing, the compound was recrystallized from 50% methanol.

*Example II*

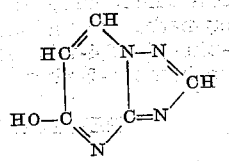

5-hydroxy-1,3,4-triazaindolizine 2 grams of 5-hydroxy-6-carbethoxy-1,3,4-triazaindolizine, prepared according to Example I, were warmed on the steam bath with 20 cc. of 5% NaOH solution for ½ hour. The solution was cooled, diluted with 50 cc. of water and filtered. To the filtrate were added 7 cc. of 5 N $H_2SO_4$. The mixture was then boiled for ½ hour and cooled. 2 cc. of 5 N NaOH were added and the solution was allowed to stand in an ice bath for one hour, during which time the decarboxylated compound precipitated. The product was recrystallized from boiling water.

*Example III*

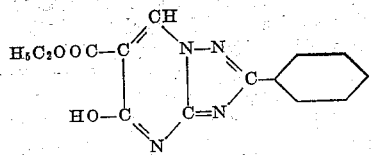

5-hydroxy-6-carbethoxy-2-phenyl-1,3,4-triazaindolizine

Example I was repeated with the exception that an equivalent quantity of 3-amino-5-phenyl-1,2,4-triazole was substituted for 3-amino-1,2,4-triazole.

In the preparation of an emulsion containing the stabilizers used according to my invention, a solution of the stabilizer in a suitable solvent, such as alcohol or an alcohol-water mixture, adjusted to a neutral or slightly alkaline pH, i. e., pH 7.5 to 10, is made up and the solution mixed with the emulsion at any point during its preparation, but preferably during ripening or just prior to coating in concentrations varying from 25 mg. to 500 mg. per liter of emulsion. The actual concentration employed will depend upon the type of emulsion used and varies slightly with the compound employed.

The method of testing the stabilizers in the following examples consists of coating two film strips, such as cellulose acetate, with the same emulsion, one with and one without stabilizer, storing the emulsions in an incubator for 6 days at 50° C., then exposing, developing, fixing, and washing the same under standard conditions. The fog density or blackening produced in the unexposed areas in the two emulsions is then measured in a transmission densitometer of standard type.

The following examples will serve to illustrate certain ways in which the stabilizers of my invention have been applied, but are not to be construed as limiting the invention.

*Example IV*

A photographic film, coated with an ordinary gelatin-bromoiodide emulsion of normal speed and contrast on development under standard conditions, after incubation for six days at 50° C., gave a fog of 0.28 density. Another film, coated with the same emulsion containing an addition of 150 mg. of the compound of Example I per 1000 cc. of emulsion equivalent to about 50 grams of silver nitrate and developed under the same conditions, after the same incubation, gave a fog of 0.08 density.

*Example V*

Example IV was repeated with the exception that an equivalent quantity of the compound of Example II was substituted for the compound of Example I. The results obtained were almost identical with those obtained in Example IV.

*Example VI*

Example IV was again repeated with the exception that an equivalent quantity of the compound of Example III was substituted for the compound of Example I. After incubation and development, the emulsion containing the compound of Example III gave a fog of 0.1.

Further experiments have shown that emulsions containing stabilizers in accordance with my invention have not only improved keeping qualities (i. e., a reduction in the fog produced by incubation or by long storage) but undergo little or no change in speed to which some emulsions are susceptible.

The stabilizers, which I have described and employed, may be used in various kinds of emulsions. In addition to being useful in orthochromatic and panchromatic emulsions, they may also be used in non-sensitized emulsions and X-ray emulsions. If used with sensitizing dyes they may be added to the emulsion before or after the dyes are added. The dispersing agents for the silver halides may be gelatin or other colloid, such as, water soluble cellulose derivatives, e. g., hydroxyethyl cellulose, methyl cellulose, carboxy-oxy-cellulose, low acetyl value cellulose acetate, polyvinyl alcohol, and the like. The stabilizers may also be employed in gelatin or other colloid, such as polyamides or a mixture of gelatin with a polyamide as described in United States Patent 2,289,775; polyvinyl alcohol and jelling compound as described in United States Patent 2,249,537; polyvinyl acetaldehyde acetal resins and partially hydrolyzed acetate resins described in United States Patents 1,939,422 and 2,036,092; cellulose derivatives, e. g., cellulose nitrate, cellulose acetate, and the lower fatty acid esters of cellulose including simple and mixed esters and ethers of cellulose, and the like, as an under or overcoat for the emulsion, or as a backing layer for the support. Moreover, they may be incorporated in the support for the sensitive emulsion layer or in an intermediate layer between the sensitive emulsion layer and the support, such as the baryta coating commonly used in photographic papers, or they may be incorporated in a protective layer coated upon the emulsion surface. Furthermore, the otherwise finished photographic material may be bathed in an alcohol or alcohol-water solution containing the stabilizer.

This application is a continuation-in-part of my application Serial No. 714,905, filed December 7, 1946, which in turn is a division of application Serial No. 704,932, filed October 22, 1946, now United States Patent 2,450,397.

Various modifications of this invention will occur to persons skilled in the art, and it is, therefore, understood that the patent granted shall only be limited by the appended claims.

I claim:

1. Compounds of the general formula:

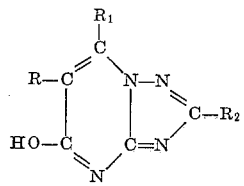

wherein R is a member selected from the class consisting of hydrogen and a carbalkoxy group of not more than 4 carbon atoms, $R_1$ is a member selected from the class consisting of hydrogen, methyl, and phenyl groups, and $R_2$ is a member selected from the class consisting of an alkyl group of not more than 4 carbon atoms, an aryl group of the benzene series, carboxy, and carbalkoxy group of not more than 5 carbon atoms, $R_2$ being carbalkoxy only when R is carbalkoxy, and being carboxy only when R is hydrogen.

2. The compound corresponding to the formula:

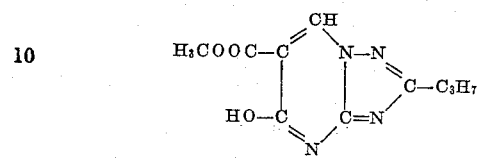

3. The compound corresponding to the formula:

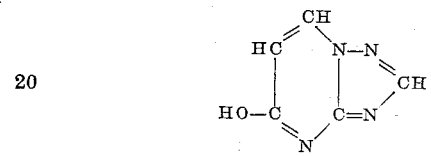

4. The compound corresponding to the formula:

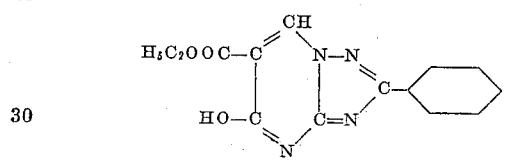

5. The process of producing 5-hydroxy-1,3,4-triazaindolizines, which comprises heating 1 mol of a compound of the general formula:

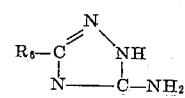

with 1 mol of a compound of the general formula:

$$R_6-C \begin{array}{c} N \\ \diagup \diagdown \\ N \quad\quad NH \\ | \quad\quad | \\ N \text{------} C-NH_2 \end{array}$$

wherein $R_3$ and $R_5$ represent an alkyl group of not more than 3 carbon atoms, $R_4$ represents a member selected from the class consisting of hydrogen, methyl and phenyl groups, and $R_6$ is a member selected from the class consisting of hydrogen, an alkyl group of not more than 4 carbon atoms, an aryl group of the benzene series, and carbalkoxy group of not more than 5 carbon atoms, and isolating said 5-hydroxy-1,3,4-triazaindolizine.

6. The process which comprises heating 1 mol of ethyl ethoxymethylene malonate with 1 mol of 3-amino-1,2,4-triazole, and isolating 5-hydroxy-6-carbethoxy-1,3,4-triazaindolizine.

7. The process which comprises heating 1 mol of ethyl ethoxymethylene malonate with 1 mol of 3-amino-1,2,4-triazole, saponifying and decarboxylating the resulting product, and isolating 5-hydroxy-1,3,4-triazaindolizine.

8. The process which comprises heating 1 mol of ethyl ethoxymethylene malonate with 1 mol of 3-amino-5-phenyl-1,2,4-triazole, and isolating 5-hydroxy-6-carbethoxy-2-phenyl-1,3,4-triazaindolizine.

NEWTON HEIMBACH.

No references cited.